United States Patent
Ruus

[11] Patent Number: 5,940,474
[45] Date of Patent: *Aug. 17, 1999

[54] ALARM SYSTEM WITH INTERCONNECTED ALARM TERMINALS

[76] Inventor: Jan Ruus, Henriksborg Näle, S-186 62 Valentuna, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/531,730

[22] Filed: Sep. 21, 1995

[30] Foreign Application Priority Data

Mar. 23, 1993 [SE] Sweden ................................. 9300964

[51] Int. Cl.⁶ ................................................. H04M 11/04
[52] U.S. Cl. ................................................. 379/49; 379/45
[58] Field of Search ........................... 379/37–40, 42–45, 379/49–51, 201, 207, 269, 214, 247

[56] References Cited

U.S. PATENT DOCUMENTS

| | | | |
|---|---|---|---|
| 3,843,841 | 10/1974 | Rubinstein | 379/38 |
| 3,925,763 | 12/1975 | Wadhwani | 379/50 |
| 3,989,900 | 11/1976 | Dibner | 379/50 |
| 5,077,788 | 12/1991 | Cook et al. | 379/45 |
| 5,109,399 | 4/1992 | Thompson | 379/45 |
| 5,125,021 | 6/1992 | Lebowitz | 379/39 |
| 5,166,972 | 11/1992 | Smith | 379/49 |
| 5,195,126 | 3/1993 | Carrier | 379/46 |
| 5,333,173 | 7/1994 | Seazholtz | 379/46 |

FOREIGN PATENT DOCUMENTS

| | | | |
|---|---|---|---|
| 3826243 | 8/1989 | Germany | 379/45 |
| WO81/02657 | 9/1981 | WIPO | 379/37 |
| WO 92/22883 | 12/1992 | WIPO . | |

*Primary Examiner*—Wing F. Chan
*Attorney, Agent, or Firm*—Dergosits & Noah LLP

[57] ABSTRACT

An alarm installation comprises a central alarm station and a number of alarm units. The alarm units can send messages to the central alarm station and the central alarm station can send messages such as voice messages or recorded spoken messages to a number of alert units. All sending and receiving operations are preferably performed on the public telephone network. The alarm units contain at least one operating device and/or detector for an emergency situation and will at the activation of such a device or detector send a message thereof to the central alarm station. The latter receives the message and will send a corresponding message, e.g. in the shape of a spoken message, to the different alert places. These different alert places can then be interconnected by the central alrm station in order to interchange information in regard of suitable measures to be made.

10 Claims, 3 Drawing Sheets

ALARM SYSTEM WITH INTERCONNECTED ALARM TERMINALS

FIELD OF THE INVENTION

The present invention relates to an alarm system or alarm installation designed to connect a number of alarm units such as shops, homes or other premises with a central alarm station, preferably through the public telephone system, that is, by means of common telephone communication.

PRIOR ART

An alarm system is disclosed in the International patent application WO 92/22883, wherein all of the communication is performed in the public telephone network and wherein the central alarm station is capable of dialling successively a number of alert stations by means of a recorded list.

SUMMARY OP THE INVENTION

The system as previously known is provided with a central alarm station, which dials, when an alarm is triggered in an alarm unit, in the same way as in the prior system, guided by a previously recorded list a number of alert or monitoring stations, that is principally telephone sets connected to the public telephone network, and then establishes a conference state between those telephone sets, where a person has answered the call, so that several persons can consult each other in regard of possible measures to be made. The central alarm station must then have a number of outgoing lines which is equal to the number of connected telephone sets. By this arrangement, also the calling of the different alert stations may be performed more or less simultaneously.

Like the prior system, the central alarm station is attached to a generally large number of telephone lines and comprises a computer of suitable type, e.g. a microcomputer or personal computer, which is provided with circuitry for communication over the telephone lines and with a permanent mass memory, e.g. a hard disk.

The central alarm station is also provided with circuitry to store, for example in the mass memory, recorded voice messages, and has circuitry to play back, that is, send on a telephone line, these messages, and/or is provided with circuitry to play up synthesized speech on a telephone line.

The telephone circuitry can also perform telephone number dialling; automatic answer upon call reception, that is, simulate that off-hook, etc.; send and receive dialling or touchpad signals of DTMF type; send and receive voice messages; detect that a line is in use or busy, etc. The circuitry can advantageously in addition be configured so that a number of different telephone connections can be established by the central alarm station, and thus, with a simultaneous transmission of recorded messages. The telephone circuitry can also perform an interconnection of a number of telephone lines.

The central alarm station also contains a control program to perform all of these functions. The central alarm station is normally unmanned, but an operator can of course directly control it via the keyboard attached to the computer.

The alarm units have considerably less expensively built control centres. These include, as is conventional, a controller such as a microprocessor having a suitable control program; and with for example a control panel with a keyboard of essentially telephone type having keys for digits and some control characters and indicator lamps, a small non-volatile memory; additionally with interfaces, drive circuits, and terminals for operating means such as emergency switches and push buttons of assault alarm and for different detectors as for burglary or break-in, fire, overflow, temperature; for sirens, for example located both inside and outside the house; telephone circuitry for sending alarm messages to the central alarm station, a receiver for signals from a hand-held transmitter producing signals for activating and turning off the alarm. All of these different apparatus need not exist, but a control unit with a memory, at least some detector for an emergency condition, and means for sending messages to the central alarm station are required. The expensive and more delicate circuitry for speech synthesis and/or for the storing/replaying of voice messages thus are arranged only in the central alarm station.

The alarm installation thus comprises a central alarm station and a number of alarm units, the alarm units being arranged to send messages to the central alarm station and the central alarm station being able to send voice messages or recorded messages to a number of alerting or monitoring locations. All transmission and reception is performed on the public telephone network. The central alarm station can get confirmation of reception of played up messages by means of some simple sending method such as by means of signals obtained by operating the keypad of a receiving telephone set.

The alarm units comprise at least one detector or operating means arranged to be activated by a person, for an emergency situation and will immediately, upon activation of such a detector or operating means, send a message thereof to the central alarm station. The station receives the message and will send a corresponding voice message to the various monitoring stations. Then the interconnecting operation of the different telephone sets, with which connections have been established, is performed. In this state comprising several interconnected telephone sets it is also possible to attach, on a particular command, e.g. by depressing a suitable key on one of the interconnected telephone sets, to the interconnected state further telephone sets, such as the police, so that the conference situation or state is widened. In that case the central alarm station retrieves a suitable telephone number/suitable telephone numbers from a secondary list linked to the list by means of which the interconnection has been previously established.

Generally the alarm installation can comprise a central alarm station and a number of alarm units, which are placed at the locations which are to be monitored, and alarm terminals, which are placed at a number of monitoring locations or turn-out response locations. The alarm units, the central alarm station and the alarm terminals are connected with each other, preferably by means of lines in the public telephone network. The alarm units include devices for communicating, for instance for dialling, the central alarm station and for transferring on the established connection line alarm information, the central alarm station then comprising means for receiving alarm information. The central alarm station comprises for each associated alarm unit a stored list of those alarm terminals to which a message shall be conveyed when the central alarm station receives alarm information to the effect that an alarm has been triggered in this alarm unit, means for establishing a connection with, e.g. for dialling on the public telephone network, those alarm terminals which correspond to the numbers in that list, and means for interconnecting those connections, which are established with alarm terminals at the triggering of an alarm, so that these alarm terminals can communicate with other.

In addition, a secondary list of telephone numbers of alert places may be provided.

BRIEF DESCRIPTION OF DRAWINGS

The invention shall now be described in more detail with reference to the accompanying drawings, in which.

DESCRIPTION OF THE INVENTION

Figure 1:
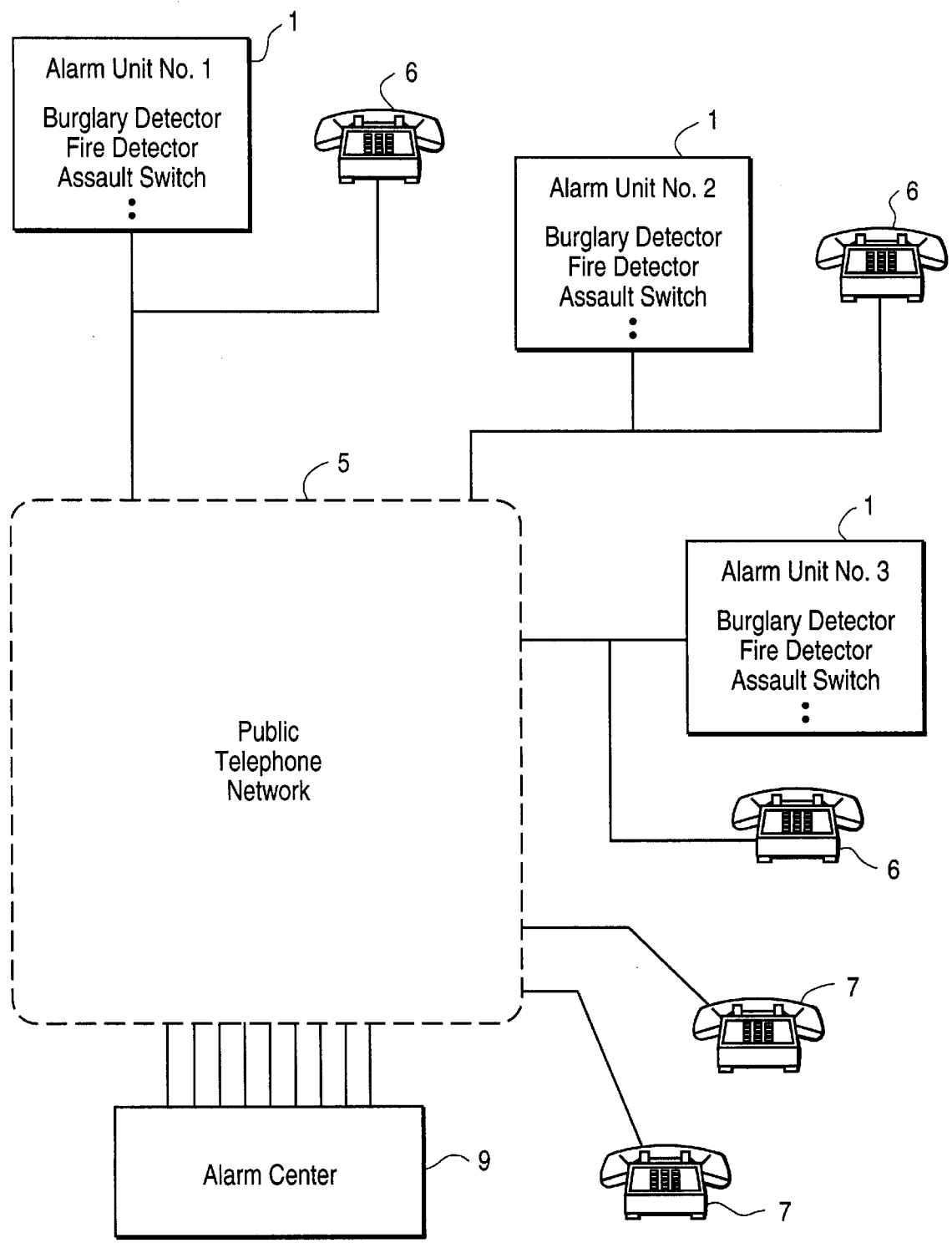
FIG. 1 schematically shows the general configuration of the alarm installation.

In FIG. 1 a number of alarm units are shown, which are generally indicated by the numeral 1, and which by means of connecting wires are linked with the public telephone network S. The alarm units 1 include push-buttons for assault alarm, for other emergency situations and/or a number of different detectors for various emergency situations, e.g., break-in detectors, fire detectors, etc. The alarm units 1 are also generally connected to an ordinary telephone line, to which an ordinary private telephone 6 can also be connected. Ordinary telephone sets 7 without alarm units are also of course connected to the public telephone network 5. A central alarm station, as generally indicated at 9, is also connected to the public telephone network 5 by means of several lines 11.

Figure 2:
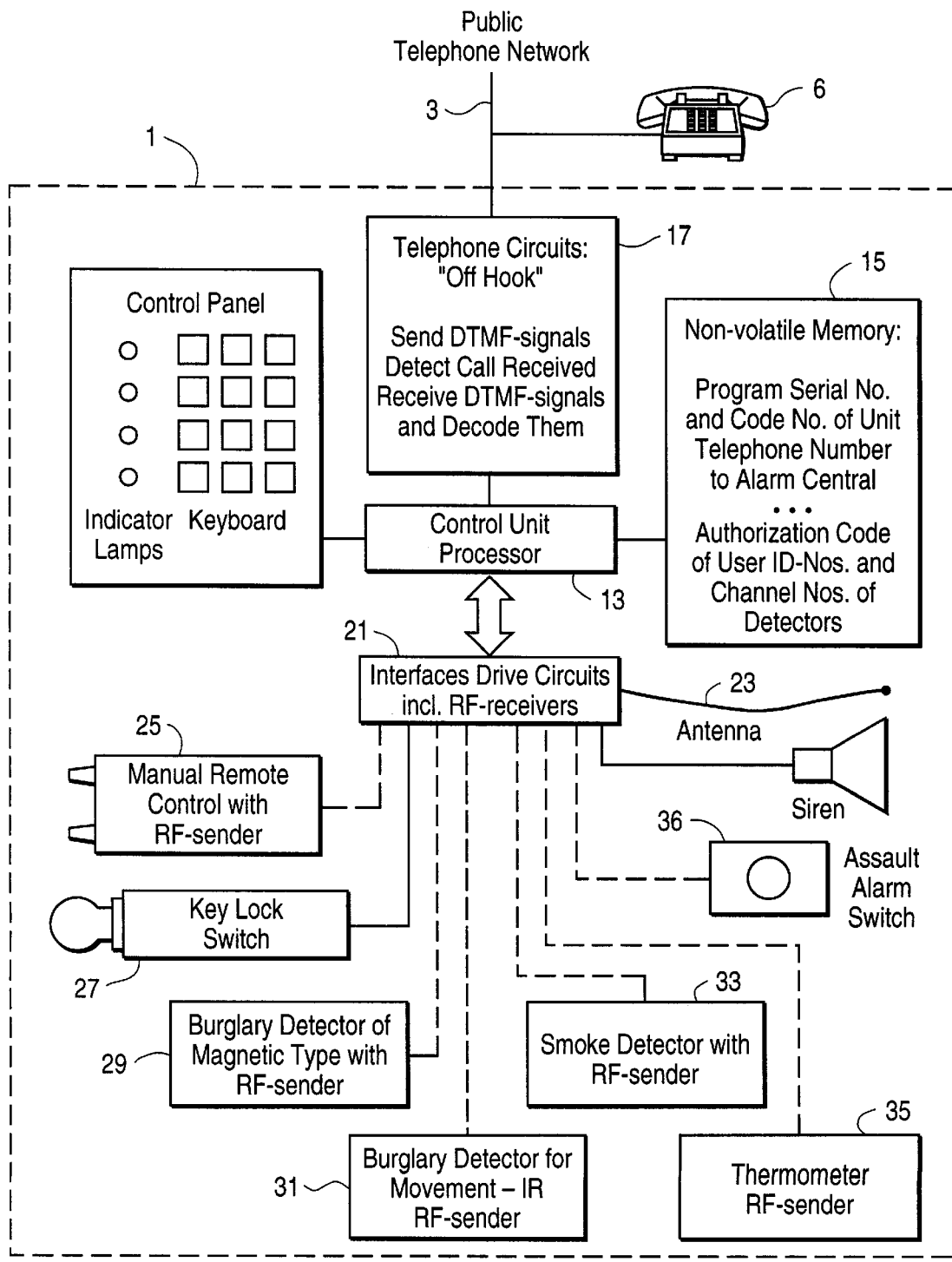
FIG. 2 shows a block diagram of an alarm unit.

In FIG. 2 a block diagram of an alarm unit 1 is shown. The central part thereof is a control unit 13 in the shape of a simple processor. Belonging to it are, among other things, a non-volatile memory 15. The latter has a permanent portion, in which of course the program for the control unit is stored along with certain data. In a writable part of the memory 15 other data are stored, which are variable but must not be lost when power to the alarm unit fails. In the permanent section of the non-volatile memory 15 is in this way stored for example the serial number of the alarm unit, a particular code number or identification number for the alarm unit 1 and the telephone number of the central alarm station 9. In the writable portion the user's authorization code and identification number, and channels for connected detectors and other devices are stored.

The control unit 13 is, via telephone circuitry 17, connected to the line 3 to the public telephone network. The telephone circuitry 17 comprises normal functions for performing automatic dialling, which for example are found in conventional fax machines and telephone modems. These functions include, for example, automatic answering ("Off-hook"), conversion of a digital number sequence to dual-tone (DTMF) signals and the transmission of these signals, and detecting establishment of a connection with the telephone number with which one will communicate. The telephone circuits 17 also include functions for reception of DTMF signals and conversion thereof to suitable digital signals.

A control panel 19 is connected to the control unit 13 and comprises a simple keyboard for telephone communication, with the digits 0–9 and two control keys. Additionally, there are a few indicator lamps 20.

The control unit 13 is via a device 21, which generally can include different types of interfaces, drive circuits, and radio frequency receivers, connected to the various detectors and operating devices, and signalling devices which can be placed at the location which shall be monitored, and at which generally the control unit plus accessories are also installed. When the device 21 includes a rf-receiver, it also has an antenna 23 connected thereto.

The various actuating or operating devices or detector means include a hand actuated remote control 25 or hand held transmitter of the same type as is used for the control of automobile alarms. It comprises a radio frequency transmitter and operating buttons. Additionally, a key-switch 27 can be connected, for example via a permanent cable, to the interface and drive unit 21. Additionally, break-in detectors such as 29 and 31 of magnetic type and IR type respectively are arranged, for detection of different movements within a certain volume, for example also communicating with the interface and drive unit 21 via radio frequency transmitters. Other detectors for emergency situations can include smoke detectors 33, thermometers 35, etc. Other control devices such as a unit 36 for signalling an assault or an alarm for the handicapped and similar persons can of course also be arranged. Additionally a siren 37 in connected via a permanent cable to the interface and drive unit 21.

Figure 3:
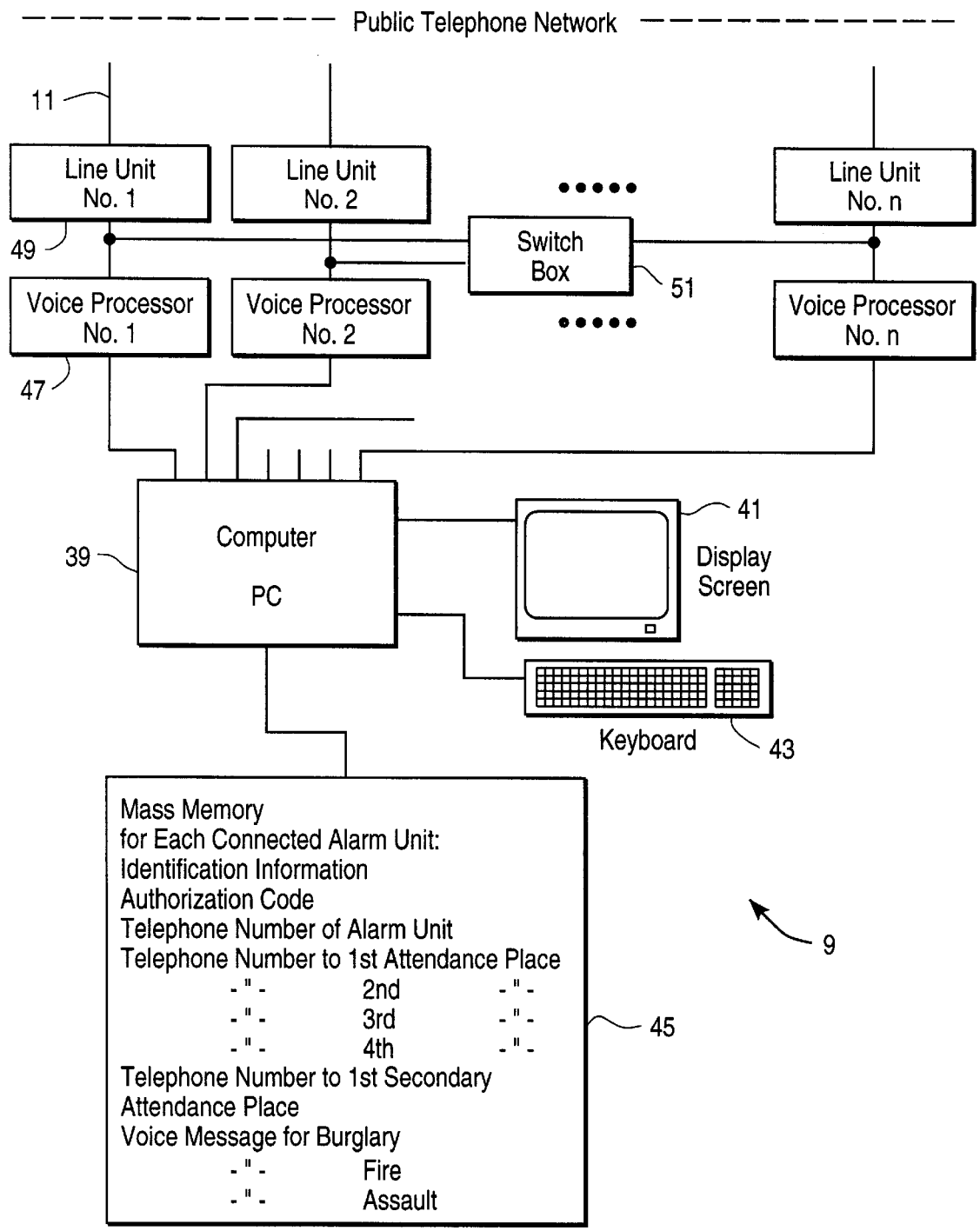
FIG. 3 shows a block diagram of a central alarm station.

In FIG. 3 a block diagram of the central alarm station 9 is shown. It comprises as its main component a computer 39, for example an ordinary personal computer with a monitor or display 41 and a keyboard 43. The computer 39 has a permanent mass memory 45, for example a hard diskdrive, which is suited for permanent storage of a large amount of information. A number of accessory boards are arranged for the computer 39, such that the computer 39 is connected to lines 11 to the public telephone network via voice or speech processors 47 and line interface units 49. The speech processors 47 convert information received from the computer 39 to audible speech. The line units 49 are arranged to perform principally the same functions as the telephone circuitry 17 in the alarm units (FIG. 1), that is, they can establish telephone connections, send and receive, encode and decode DTMF signals, etc. The lines from the line units 49 are also connected to a switch unit or exchange unit 51, which, commanded by the computer 39, is capable of interconnecting lines 11 as selected by the computer.

For each connected alarm unit, in the mass memory 45 identification information, authorization code, telephone number to the alarm unit, the telephone numbers of the first list comprising those telephone numbers which are dialled automatically upon reception of an alarm from the alarm unit, and the telephone numbers of the secondary list which are dialled at a particular command in a conference interconnection state, voice messages for various emergency situations such as burglary, fire, assault, etc.

The operation of the alarm installation will now be described.

When a new alarm unit 1 shall be connected to the central alarm station 9, it is performed in the same way as in the previously known system. The user of the alarm unit 1 can thus himself enter those telephone numbers which are to be dialled when an alarm is triggered. These telephone numbers can also, in a simple way be deleted or changed. Further, telephone numbers of a secondary list can also be entered.

When an alarm has been triggered, the central alarm station 9 performs alarm diallings or calls, so that all telephone numbers on the monitor stations list of the alarming unit will be contacted. If desired, then a message can be played up in a connected telephone set of type: "If you wish to participate in a telephone conference with other monitoring stations, please press button 1. Otherwise press button 0." The depressed key is then recorded by the central alarm station. When all monitoring locations or stations have been asked and corresponding to those cases where the answers 1 (="Yes") are obtained, the computer 39 send signals to the interconnection box 51, that the corresponding telephone lines are to be interconnected. Alternatively, also an interconnection ay be always performed of the dialled telephone numbers. After the interconnection of another telephone line, possibly a message thereof can be replayed in the interconnected telephone lines. In this message information can also be inserted in regard of the possibility of interconnecting further telephone lines to the conference, such as "If you desire the participation of the police, then please press button 7." When the circuitry of the central alarm station then detects that the key 7 has been depressed on one of the interconnected telephone sets, the central alarm station dials the telephone number of the secondary list which then comprises a single telephone number. Alternatively, also e.g. a depression of the key 8 may signal dialling the telephone number having order number 2 in the secondary list, etc.

I claim:

1. An alarm installation comprising a central alarm station and at least one alarm unit, which is placed at a location which is to be monitored, and several alarm terminals, which are placed at a number of monitoring locations or turn-out response locations, connection lines between both the alarm unit and the central alarm station, and between the central alarm station and the alarm terminals, characterized by means in the central alarm station for, upon reception of an alarm from the alarm unit through the connection lines, transmitting information thereof to alarm terminals, and means in the central alarm station for, after the transmission of such information to alarm terminals, establishing interconnections between each one of these alarm terminals in order to transfer information between the alarm terminals.

2. An alarm installation according to claim 1, characterized in that the means in the central alarm station for establishing interconnections between alarm terminals comprise means for connection of the connection lines between the central alarm station and the alarm terminals with each other.

3. An alarm installation according to claim 1, characterized in that the connection lines between the central alarm station and the alarm terminals comprise lines in the public telephone network.

4. An alarm installation according to claim 3, characterized by means in the central alarm station for dialling alarm terminals and for establishing a connection with an alarm terminal on the public telephone network.

5. An alarm installation according to claim 1, characterized in that the means in the central alarm station for, upon reception of an alarm from an alarm unit, transmitting information thereof to alarm terminals through the connection lines, comprises means for storing, for this alarm unit, a list of those alarm terminals to which information shall be transmitted, to the effect that an alarm has been triggered in the alarm unit.

6. An ala installation according to claim 3, characterized in that the means in the central alarm station for storing a list of those alarm terminals, to which information is to be transmitted that an alarm has been triggered in the alarm unit, when an alarm is triggered in this alarm unit, are arranged to store for this alarm unit, also a secondary list of alarm terminals, not comprised in the alarm terminals included in the first mentioned list, with which connections can established after establishing connections with alarm terminals comprised in the first mentioned list.

7. An alarm installation according to claim 3, characterized in that the means in the central alarm station for transmitting, upon reception of an alarm from an alarm unit, through the connection lines information thereof to alarm terminals, comprise means for storing, for this alarm unit, a list of the telephone numbers of those alarm terminals, which are to be dialled and with which a connection is to be established on the public telephone network and to which information is to be transmitted that an alarm has been triggered in the alarm unit, when an alarm is triggered in this alarm unit.

8. An alarm installation according to claim 7, characterized in that the means for storing, for an alarm unit, a list of the telephone numbers of those alarm terminals, which are to be dialled and with which a connection is to be established on the public telephone network and to which information is to be transmitted that an alarm has been triggered in the alarm unit, when an alarm is triggered in this alarm unit, are arranged to store for this alarm unit also a secondary list of telephone numbers of alarm terminals, not comprised in the alarm terminals in the first mentioned list, which can be dialled and with which connections can be established after establishing interconnections of alarm terminals in the first mentioned list.

9. An alarm installation according to claim 8, characterized by means in the central alarm station comprises means for receiving number dialling signals obtained over a telephone connection established with the central alarm station.

10. An alarm installation according to claim 1, characterized by means in the alarm terminals for acknowledging, to the central alarm station, information received on the connection line between the alarm terminal and the central alarm station, that an alarm has been triggered, and means in the central alarm station for receiving and testing such acknowledgments from the alarm terminals.

* * * * *